(12) United States Patent
Verrocchi

(10) Patent No.: US 7,473,473 B2
(45) Date of Patent: Jan. 6, 2009

(54) TEAR RESISTANT SHRINK FILM

(75) Inventor: Anthony Verrocchi, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 394 days.

(21) Appl. No.: 11/072,189

(22) Filed: Mar. 4, 2005

(65) Prior Publication Data

US 2006/0115667 A1 Jun. 1, 2006

Related U.S. Application Data

(60) Provisional application No. 60/632,062, filed on Dec. 1, 2004.

(51) Int. Cl.
*B32B 27/08* (2006.01)
*B32B 27/32* (2006.01)
(52) U.S. Cl. .................. 428/517; 428/213; 428/516; 428/519; 428/520; 428/910
(58) Field of Classification Search ................. 428/213, 428/516, 517, 519, 520, 910
See application file for complete search history.

(56) References Cited

U.S. PATENT DOCUMENTS

| | | | | |
|---|---|---|---|---|
| 4,210,686 | A | 7/1980 | Gajewski et al. | 428/35.2 |
| 4,399,181 | A | 8/1983 | Yoshimura et al. | 428/213 |
| 4,879,177 | A | 11/1989 | Boice | 428/339 |
| 5,300,353 | A | 4/1994 | Yoshimura et al. | 428/213 |
| 5,350,622 | A | 9/1994 | Speer et al. | 428/215 |
| 5,385,781 | A | 1/1995 | Chundury et al. | 428/330 |
| 5,443,765 | A | 8/1995 | Yoshimura et al. | 264/488 |
| 5,635,262 | A | 6/1997 | Best et al. | 428/36.92 |
| 5,663,002 | A | 9/1997 | Schirmer | 428/475.8 |
| 5,756,577 | A | 5/1998 | Gutiérrez-Villarreal | 525/88 |
| 5,837,335 | A | 11/1998 | Babrowicz | 428/34.9 |
| 5,993,922 | A | 11/1999 | Babrowicz et al. | 428/35.7 |
| 6,031,049 | A | 2/2000 | Chino et al. | 525/92 D |
| 6,177,517 | B1 | 1/2001 | Guntherberg et al. | 525/80 |

(Continued)

FOREIGN PATENT DOCUMENTS

EP 0 927 210 6/2000

(Continued)

OTHER PUBLICATIONS

Chemical Market Resources Inc. Staff, "BASF To Launch New TPE grade, Oppanol IBS®", Global PO & E, vol. 2, Issue 17, Aug. 23, 2004, pp. 1, 11-12.

(Continued)

*Primary Examiner*—D. S Nakarani
(74) *Attorney, Agent, or Firm*—Mark B. Quatt

(57) ABSTRACT

A shrink film includes an internal layer including a styrene/butadiene/styrene block copolymer; and first and second outer layers including an olefinic polymer. First and second intermediate layers including an ethylene copolymer having a melt index less than 4.0 can be optionally included. Alternatively, a shrink film includes an internal layer including an ethylene copolymer having a melt index less than 4.0; a first and second intermediate layer each including a styrene/butadiene/styrene block copolymer; and a first and second outer layer each including an olefinic polymer. Film of the invention has a free shrink of from 40% to 80% at 240° F., and an Elmendorf tear of from 70 grams/mil to 300 grams/mil, in at least one of the longitudinal and transverse directions.

10 Claims, 1 Drawing Sheet

U.S. PATENT DOCUMENTS

| | | |
|---|---|---|
| 6,369,160 B1 | 4/2002 | Knoll et al. ............... 525/89 |
| 6,479,138 B1 | 11/2002 | Childress ............... 428/213 |
| 6,517,950 B1 | 2/2003 | Patrick et al. ............... 428/516 |
| 6,716,499 B1 | 4/2004 | Vadhar ............... 428/35.3 |
| 6,783,842 B2 | 8/2004 | Niepelt ............... 428/213 |
| 7,135,234 B2 | 11/2006 | Donnelly et al. ............... 428/516 |
| 2003/0176582 A1 | 9/2003 | Bening et al. ............... 525/242 |
| 2004/0142195 A1 | 7/2004 | Roberts et al. ............... 428/515 |
| 2006/0057410 A1 | 3/2006 | Saavedra et al. ............... 428/515 |

FOREIGN PATENT DOCUMENTS

| | | |
|---|---|---|
| EP | 1 084 034 | 9/2004 |
| JP | 54129075 | 10/1979 |
| JP | 6143408 | 5/1994 |
| JP | 9235443 | 9/1997 |
| JP | 2000185373 | 7/2000 |
| JP | 2001096678 | 4/2001 |
| JP | 2001191461 | 7/2001 |
| JP | 2002121355 | 4/2002 |
| JP | 2002161145 | 6/2002 |
| JP | 2002226670 | 8/2002 |
| JP | 2003033968 | 2/2003 |
| JP | 2003155356 | 5/2003 |
| JP | 2004027029 | 1/2004 |
| JP | 2004034503 | 2/2004 |
| WO | 98/12240 | 3/1998 |
| WO | 99/54133 | 10/1999 |

OTHER PUBLICATIONS

English Language Abstract of DE 19638254, 1 page, Jul. 7, 1999.
Chevron Phillips Chemical Company, "K-Resin Styrene-Butadiene Copolymers", Technical Service Memorandum #322, 2002, 12 pages.
www.convertingmagazine.com, "Resins, flexibles are Pack Expo show standouts", Nov. 4, 2002, 3 pages.
Patent Abstracts Of Japan, Publication No. 09076427, Mar. 25, 1997, 1 page.
BASF, "The First Styrenic TPE* from BASF", Oct. 1998, 2 pages.
Ron Sheu, "Styrolux® & Tough SBC Resin", www.basf.com, Jun. 8, 2005, 33 pages.
"Styroflex® 2G 66", BASF, Feb. 7, 2003, 4 pages.
"Styrenics", www.basf.de, 2002, 2 pages.
"Styrolux and Styroflex", www.corporate.basf.com, Aug. 23, 2004, 6 pages.
Robert Huber, "Efficient production of transparent thin films", Trade press conference K 2004, Jun. 22 & 23, 2004, 9 pages.
"Styroflex® 2G 66", BASF, May 2003, 2 pages.
"Styroflex / Styrolux / GPPS Sheet Blend Data", Dec. 9, 2003, 1 page.
Keith A. Edwards, "Styroflex® 2 G 66 SBS Block Copolymer with Unique Structure and Properties", Aug. 26, 2004, 46 pages.
PCT International Preliminary Report on Patentability, issued Jun. 5, 2007 (10 pages).

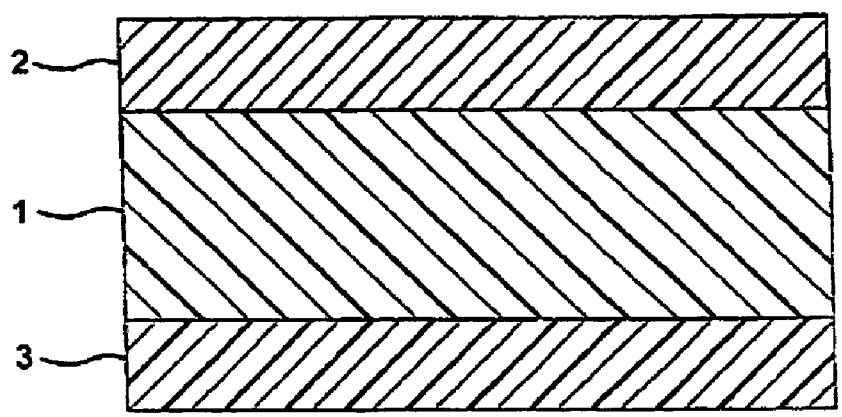
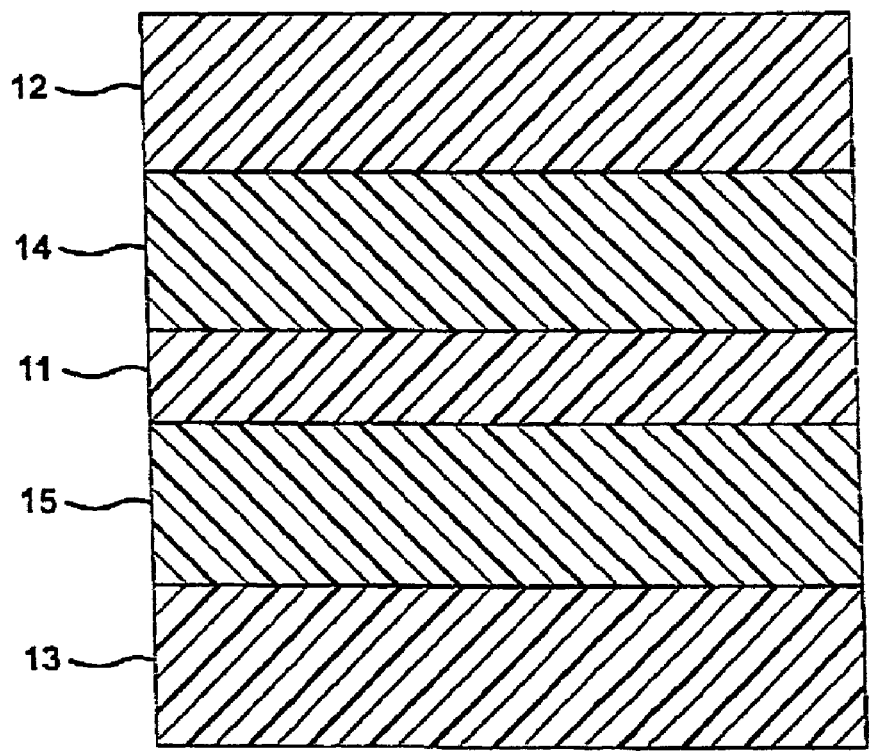

TEAR RESISTANT SHRINK FILM

This application claims the benefit of U.S. Provisional Application Ser. No. 60/632062 filed Dec. 1, 2004, the contents of which are hereby incorporated by reference.

FIELD OF THE INVENTION

The present invention relates to a solid state oriented, heat shrinkable thermoplastic film.

BACKGROUND OF THE INVENTION

Shrink films are known in the art. These films offer relatively high free shrink, and are suitable for packaging many food and non-food articles. They are useful for example as overwrap films for multiunit packaging for applications such as warehouse stores.

An example of such films is poly(vinyl chloride) (hereinafter "PVC") film. PVC film exhibits good elastic recovery, high modulus, and low shrink tension. Unfortunately, PVC film suffers from poor tear resistance.

Polyolefinic packaging materials have been developed for shrink end-uses. An example is the line of polyolefinic films supplied commercially by Cryovac, Inc. under the designations D- 955™.

The present invention in some embodiments is a shrink film with good tear resistance.

SUMMARY OF THE INVENTION

In a first aspect, a multilayer solid state oriented heat shrinkable film comprises an internal layer comprising a styrene/butadiene/styrene block copolymer; and a first and second outer layer each comprising an olefinic polymer; wherein the film has a free shrink (ASTM D 2732) of from 40% to 80% at 240° F. in at least one of the longitudinal and transverse directions; and an Elmendorf tear (ASTM D 1922-03) of from 70 grams/mil to 300 grams/mil in at least one of the longitudinal and transverse directions.

The internal layer comprising a styrene/butadiene/styrene block co-polymer can comprise from 5 to 30% of the total film thickness.

In a second aspect, a multilayer solid state oriented heat shrinkable film comprises an internal layer comprising a styrene/butadiene/styrene block copolymer; a first and second intermediate layer each comprising an ethylene copolymer having a melt index less than 4.0; and a first and second outer layer each comprising an olefinic polymer; wherein the film has a free shrink (ASTM D 2732) of from 40% to 80% at 240° F. in at least one of the longitudinal and transverse directions; and an Elmendorf tear (ASTM D 1922-03) of from 70 grams/mil to 300 grams/mil in at least one of the longitudinal and transverse directions.

In a third aspect, a multilayer solid state oriented heat shrinkable film comprises an internal layer comprising an ethylene copolymer having a melt index less than 4.0; a first and second intermediate layer each comprising a styrene/butadiene/styrene block copolymer; and a first and second outer layer each comprising an olefinic polymer; wherein the film has a free shrink (ASTM D 2732) of from 40% to 80% at 240° F. in at least one of the longitudinal and transverse directions; and an Elmendorf tear (ASTM D 1922-03) of from 70 grams/mil to 300 grams/mil in at least one of the longitudinal and transverse directions.

In a fourth aspect, a method of making a film comprises extruding a sheet of film comprising an internal layer comprising a styrene/butadiene/styrene block copolymer, and a first and second outer layer each comprising an olefinic polymer; quenching the extruded sheet of film; reheating the quenched sheet of film to its orientation temperature; and orienting the reheated sheet of film to produce a heat shrinkable film, the film having a free shrink (ASTM D 2732) of from 40% to 80% at 240° F. in at least one of the longitudinal and transverse directions; and an Elmendorf tear (ASTM D 1922-03) of from 70 grams/mil to 300 grams/mil in at least one of the longitudinal and transverse directions.

In a fifth aspect, a method of making a film comprises extruding a sheet of film comprising an internal layer comprising a styrene/butadiene/styrene block copolymer, a first and second intermediate layer each comprising an ethylene copolymer having a melt index less than 4.0, and a first and second outer layer each comprising an olefinic polymer; quenching the extruded sheet of film; reheating the quenched sheet of film to its orientation temperature; and orienting the reheated sheet of film to produce a heat shrinkable film, the film having a free shrink (ASTM D 2732) of from 40% to 80% at 240° F. in at least one of the longitudinal and transverse directions; and an Elmendorf tear (ASTM D 1922-03) of from 70 grams/mil to 300 grams/mil in at least one of the longitudinal and transverse directions.

In a sixth aspect, a method of making a film comprises extruding a sheet of film comprising an internal layer comprising an ethylene copolymer having a melt index less than 4.0, a first and second intermediate layer each comprising a styrene/butadiene/styrene block copolymer, and a first and second outer layer each comprising an olefinic polymer; quenching the extruded sheet of film; reheating the quenched sheet of film to its orientation temperature; and orienting the reheated sheet of film to produce a heat shrinkable film, the film having a free shrink (ASTM D 2732) of from 40% to 80% at 240° F. in at least one of the longitudinal and transverse directions; and an Elmendorf tear (ASTM D 1922-03) of from 70 grams/mil to 300 grams/mil in at least one of the longitudinal and transverse directions.

In any of the above-disclosed methods, or the methods disclosed throughout this specification, the quenched extruded sheet of film can optionally be crosslinked, by e.g. e-beam irradiation or chemical crosslinking, before or after the reheating step.

The reheated sheet of film can be monoaxially or biaxially oriented by e.g. trapped bubble orientation or tenter frame orientation.

Definitions

"Adhered" herein refers to the adhesion of one layer to another, or adhesion of a patch to a bag, with or without a tie layer, adhesive, or other layer therebetween. A patch can be adhered to a bag by adhesive lamination, e.g. by the application of a polyurethane or other adhesive; by corona treatment of surfaces of the patch and/or bag that will be brought into adhering contact; or by any other suitable method.

"Alpha-olefin" herein refers to olefinic compounds, whether unsubstituted or substituted, in which the first two carbon atoms in the chain have a double bond therebetween. Examples include ethylene, propylene, butene, hexene, and octene.

"Ex." herein refers to an example of the invention.

Elmendorf Tear values herein are in accordance with ASTM D 1922-03.

"Ethylene/alpha-olefin copolymer" (EAO) herein refers to a copolymer of ethylene with one or more aliphatic comonomers selected from $C_3$ to $C_{10}$ alpha-olefins such as propene, butene-1, hexene-1, octene-1, etc. in which the molecules of the copolymers assemble as long polymer chains with relatively few short chain branches arising from the alpha-olefin which was reacted with ethylene. This molecular structure is to be contrasted with conventional high pressure low density (LDPE) or medium density polyethylenes which are highly branched homopolymers and contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, and ESCORENE™ resins supplied by Exxon.

Free Shrink values herein are in accordance with ASTM D 2732.

Haze values herein are in accordance with ASTM D 1003.

"Homogeneous ethylene/alpha olefin copolymer" (HEAO) herein refers polymerization reaction products of narrow molecular weight distribution ($M_w/M_n$ less than 3) and narrow composition distribution, referred to as to single-site polymerized polymers. These include linear homogeneous ethylene/alpha olefin copolymers (linHEAO) such as TAFMER™ resins supplied by Mitsui Petrochemical Corporation, EXACT™ resins supplied by Exxon, as well as long chain branched (lcbHEAO) AFFINITY™ resins supplied by the Dow Chemical Company, or ENGAGE™ resins supplied by DuPont Dow Elastomers. Homogeneous EAO copolymers may be polymerized using vanadium catalysts, as in the case of the TAFMER™ products, or may employ a metallocene catalyst as in the case of the more recent EXACT™ or AFFINITY™ products.

"Heterogeneous" polymers herein refers to polymerization reaction products of relatively broad molecular weight and relatively wide composition distribution, such as very low density polyethylene (VLDPE), ultra low density polyethylene (ULDPE), and linear low density polyethylene (LLDPE).

"Intermediate" herein refers to a layer of a multi-layer film which is between an outer layer and an internal layer of the film.

"Internal" herein refers to a layer of a multilayer film, patch, or bag that is not an outermost layer of the film, patch, or bag; i.e. an internal layer is located between two other layers of the film, patch, or bag structure.

"Lamination", "laminated sheet", and the like refer herein to the process, and resulting product, made by bonding together two or more layers of film or other materials. Lamination can be accomplished by joining layers with adhesives, joining with heat and pressure, and even spread coating and extrusion coating. The term laminate as used herein is also inclusive of coextruded multilayer films comprising one or more tie layers.

"L" and "LD" herein refer to the longitudinal direction, i.e. the direction of the film parallel to the path of extrusion. "T" and "TD" herein refer to the transverse direction, i.e. the direction of the film transverse to the path of extrusion.

"Linear low density polyethylene" (LLDPE) herein refers to polyethylene (ethylene/alpha-olefin copolymer) having a density from 0.916 to 0.925 grams per cubic centimeter.

"Linear medium density polyethylene" (LMDPE) herein refers to polyethylene having a density from 0.926 to 0.939 grams per cubic centimeter.

"Melt index" herein, with respect to ethylene polymers and copolymers, refers to ASTM D 1238-90, Condition 190° C./2.16 kilograms.

"Multicomponent ethylene/alpha-olefin interpenetrating network resin" or "IPN resin" herein refers to multicomponent molecular mixtures of polymer chains which are interlaced at a molecular level and are thus true solid state solutions. These become new compositions exhibiting properties distinct from parent constituents. IPN resins provide phase co-continuity leading to enhancement of physical properties, and may exhibit bimodal or multimodal curves when analyzed using TREF or CRYSTAF. "IPN resins" includes semi-interpenetrating networks including crosslinked and uncrosslinked multicomponent molecular mixtures having a low density fraction and a high density fraction. Examples of IPN resins include ELITE™ resins from Dow.

"Olefinic polymer" herein refers to a polymer or copolymer that includes an olefinic moiety, or is derived at least in part from an olefinic monomer. Examples includes low density polyethylene, ethylene/alpha-olefin copolymer, ethylene/vinyl acetate copolymer; ethylene/acrylic acid copolymer, etc.

"Outer layer" herein refers to what is typically an outermost, usually surface layer or skin layer of a multi-layer film, although additional layers, coatings, and/or films can be adhered to it.

"Polymer" herein refers to homopolymer, copolymer, terpolymer, etc. "Copolymer" herein includes copolymer, terpolymer, etc.

"Solid state oriented" herein refers to films obtained by either co-extrusion or extrusion coating of the resins of different layers to obtain a primary thick sheet or tube (primary tape) that is quickly cooled to a solid state to quench (stop or slow) crystallization of the polymers, thereby providing a solid primary film sheet. The primary sheet is then re-heated to the so-called orientation temperature, and thereafter biaxially stretched at the orientation temperature using either a tubular solid-state orientation process (for example a trapped bubble method) or using a flat solid-state orientation process (for example a simultaneous or sequential tenter frame), and finally rapidly cooled below the orientation temperature to provide a heat shrinkable film. In the trapped bubble solid state orientation process, the primary tape is stretched in the transverse direction (TD) bypassing over an air bubble which is held between two rotating nip rolls, as well as stretched in the longitudinal direction (LD) by the differential speed between the two sets of nip rolls that contain the bubble. In the tenter frame process, the sheet or primary tape is stretched in the longitudinal direction by accelerating the sheet forward, while simultaneously or sequentially accelerating the sheet in the transverse direction by guiding the heat softened sheet through a diverging geometry frame. This tenter process typically refers to a flat sheet of relatively thick film. Solid state oriented films exhibit high free shrink when reheated to their orientation temperature.

"Styrene/butadiene/styrene block copolymer" (SBS) herein refers to a block copolymer formed from styrene and butadiene monomers. Techniques for manufacturing SBS materials are disclosed in U.S. Pat. No. 6,369,160 (Knoll et al.), incorporated herein by reference in its entirety. One example of an SBS is STYROFLEX® 2G66 thermoplastic elastomer available from BASF. The styrene comonomer of the SBS can comprise from 60% to 80% by weight of the copolymer. All compositional percentages, including monomer percentages, used herein are presented on a "by weight" basis, unless designated otherwise. All film and sheet thicknesses designated in percentages are by percentage of total thickness of the film or sheet.

"Very low density polyethylene" and "ultra low density polyethylene" herein refer to polyethylene (ethylene/alpha-olefin copolymer) having a density of less than 0.916 grams per cubic centimeter.

BRIEF DESCRIPTION OF THE DRAWINGS

A detailed description of embodiments of the invention follows, with reference to the attached drawings, wherein:

FIG. 1 is a cross-sectional view of a three layer film; and
FIG. 2 is a cross-sectional view of a five layer film.

DETAILED DESCRIPTION OF THE INVENTION

Films of the invention can be made by downward coextrusion by techniques well known in the art as well as horizontal cast coextrusion, or "flat cast" techniques. The films are quenched using chilled water or chilled metal rolls to provide a relatively thick primary sheet or "tape". Films can optionally be irradiated by electron beam irradiation, e.g. at a dosage of from 10 to 280 kiloGrays. The primary sheets or tapes are reheated to their orientation temperature, and then stretched by a trapped bubble process or a tenter frame process. Films are stretched at any suitable ratio, e.g. 5:1 in each of the longitudinal and transverse directions. In the case of the tenter process, either simultaneous biaxial orientation or sequential orientation can be used to orient the film.

Where films are made by downward coextrusion, the melt strength of the extrudate becomes a significant issue. In this case, films can have an SBS with a melt mass flow rate (Condition G/200° C./5 kilograms) of from 2 to 30, such as 6. The melt strength of the film, and therefore the melt index of the SBS, is less significant in flat cast film production. Final shrink film thicknesses can vary, depending on process, end use application, etc. Typical thicknesses can range from 0.4 to 3.5 mils, such as 0.5 to 3.0 mils, 0.6 to 2.5 mils, and 1.0 to 2.0 mils.

Films of the invention can have any haze (ASTM D 1003-97) value, such as from 0.1 to 6, 0.1 to 5, 0.1 to 4, 0.1 to 3, 0.1 to 2.5, and 0.1 to 2. Films of the invention can have a haze value of less than 6, 5 or less than 5, 4 or less than 4, 3.5 or less than 3.5, 3 or less than 3, 2.5 or less than 2.5, 2 or less than 2, or 1.

The multilayer film of the invention exhibits a free shrink (ASTM D 2732-83) at a temperature of 200° F. of at least 10% in either or both of the longitudinal and transverse directions, such as 15% in both the longitudinal and transverse directions, such as 20% in both the longitudinal and transverse directions. The multilayer film of the invention exhibits a free shrink (ASTM D 2732-83) at a temperature of 240° F. of at least 40% in either or both of the longitudinal and transverse directions, such as at least 45% in both the longitudinal and transverse directions, such as 50% in both the longitudinal and transverse directions, such as at least 60% in both the longitudinal and transverse directions, such as at least 70% in both the longitudinal and transverse directions. Examples of ranges for free shrink at a temperature of 240° F. are from 30% to 80% in each direction, such as from 40% to 75%, such as from 45% to 73% in either or both of the longitudinal and transverse directions, and such as from 49% to 72% in both the longitudinal and transverse directions.

The multilayer film of the invention can be stretch oriented at stretching ratios such as at least 3:1, at least 3.25:1, at least 3.5:1, at least 4:1, at least 4.5:1, at least 4.8:1, at least 5:1, at least 6:1, at least 6.5:1, or at least 7:1 in either or both of the longitudinal and transverse directions. Ranges for stretch orientation ratio products, reported as the stretch ratio in the longitudinal direction multiplied by the stretch ratio in the transverse direction are e.g. from 9 to 56, such as from 12 to 42, 15 to 30, or 20 to 25, such as 23, and such as 25. Ranges for orientation ratios are e.g. from 3:1 to 8:1 in either or both of the longitudinal and transverse directions, such as from 4:1 to 7:1 in both the longitudinal and transverse directions, or from 5:1 to 6:1 in both the longitudinal and transverse directions.

In an alternative embodiment, the shrink film can be monoaxially oriented, i.e. the film can be oriented primarily or solely in only one of the longitudinal and transverse directions. A monooriented film is useful in making a shrink sleeve for applications such as external sleeves on rigid bottles.

The multilayer film of the invention exhibits an Elmendorf Tear (ASTM D 2732-83) (ASTM D 1922-03) of from 70 grams/mil to 300 grams/mil, such as from 80 grams/mil to 280 grams/mil, from 100 grams/mil to 250 grams/mil, from 120 grams/mil to 220 grams/mil, or from 150 grams/mil to 200 grams/mil. The multilayer film of the invention exhibits an Elmendorf Tear (ASTM D 2732-83) (ASTM D 1922-03) of at least 70 grams/mil, such as at least 80 grams/mil, at least 100 grams/mil, at least 120 grams/mil, at least 150 grams/mil, at least 200 grams/mil, and at least 250 grams/mil.

In films of the invention, the internal layer is disposed between the two outer layers. Optionally, one or more additional layers can be disposed during extrusion within the film structure, e.g. between the internal layer and one of the outer layers of a three layer film (thus providing a film of four or more layers), or between the internal layer and an intermediate layer, or between an intermediate layer and an outer layer of a five layer film (thus providing a film of six or more layers).

Although not required to carry out this invention, the multilayer film of the invention may be crosslinked, such as by chemical means or by irradiation, especially by electron beam irradiation at a dosage of e.g. from 10 to 280, such as from 20 to 250, such as from 40 to 225, from 50 to 200, or from 75 to 150 kiloGray. Although the films of the invention do not have to be irradiated, in one embodiment, irradiation can be used to improve processing of the film. Crosslinking may be enhanced by incorporating a crosslinking promoter, such as ethylene/propylene/diene terpolymer, into one or more film layers, in the manner disclosed in U.S. Pat. No. 5,993,922 (Babrowicz et al.), incorporated by reference herein in its entirety.

A crosslink promoter may be added to either the skin layers and/or the substrate layers. Films of the invention can be made by any suitable process, such as extrusion, co-extrusion, lamination, or extrusion coating. Following extrusion, the film is cooled to a solid state by, for example, cascading water, chilled water bath, chilled metal roller, or chilled air quenching. For some structures a precursor film layer or layers may be formed by extrusion with additional layers thereafter being extrusion coated thereon to form multilayer films. Multilayer tubes may also be formed with one of the tubes thereafter being coated or extrusion laminated onto the other.

Films of the invention can be subjected to an energetic radiation treatment, including, but not limited to corona discharge, plasma, flame, ultraviolet, and high energy electron treatment. Irradiation with ultraviolet or high energy electron treatment may be carried out in such a manner as to produce a crosslinked polymer network. Irradiation can be performed prior to or after any orientation step.

The SBS can comprise 100% of the layer in which it is present, or it may be present in a blend with at least one other thermoplastic homopolymer or copolymer. Examples of thermoplastic homopolymer or copolymers suitable for blending with SBS are styrene-based polymers and copolymers of polystyrene: general purpose polystyrene (GPPS)(also known as crystalline polystyrene), syndiotactic polystyrene, crystalline polystyrene, high impact polystyrene (HIPS), styrene-ethylene-styrene copolymer (SES), styrene-isoprene-butadiene-styrene (SIBS), styrene-ethylene-butadiene-styrene (SEBS), and styrene/acrylate copolymers such as styrene/methyl methacrylate copolymer (SMMA). Alpha-olefin based polymers and/or copolymers, such as ethylene/alpha-olefin copolymer, can also be used as blending materials.

Films of the invention are typically three or more layers with the SBS placed in the internal and/or intermediate positions. The SBS can comprise any appropriate percent of the total film thickness, such as at least 5%, such as at least 10%, at least 15%, and at least 20%, of the film thickness. The SBS can comprise from 1% to 50%, such as 5% to 40%, 7% to 30%, and 10% to 20% of the film thickness.

Referring to FIG. 1, a film 10 comprises an internal layer 1, a first outer layer 2, and a second outer layer 3. Outer layers 2 and 3 can be surface or skin layers.

Core layer 1 comprises an SBS. Core layer 1 comprises in one embodiment from 10% to 20%, such as 15%, of the total thickness of film 10.

First and second outer layers 2 and 3 each comprise an olefinic polymer such as ethylene/alpha olefin copolymer, homogeneous ethylene/alpha olefin copolymer, ethylene/vinyl acetate copolymer, ethylene/alkyl acrylate copolymer, ethylene/acrylic acid copolymer, ionomer, propylene homopolymer and copolymer, butylene polymer and copolymer, multi-component ethylene/alpha-olefin interpenetrating network resin, a blend of a propylene homopolymer and a propylene/ethylene copolymer, high density polyethylene, a blend of high density polyethylene and ethylene/vinyl acetate copolymer, a blend of high density polyethylene and low density polyethylene; or a blend of any of these materials. The ethylene/alpha-olefin copolymer can have a density of from 0.86 to 0.96, such as from 0.89 to 0.94, from 0.90 to 0.93, or from 0.900 to 0.915 grams/cubic centimeter. Outer layers 2 and 3 can be identical, or can differ from each other in composition (such as the difference created by the presence or amount of a blend of two or more resins), in one or more physical properties, in amount or type of additives, in degree of crosslinking, in thickness, or the like. For example, layer 2 can comprise a blend of a propylene homopolymer and a propylene/ethylene copolymer, while layer 3 can comprise a propylene/ethylene copolymer. As another example, layer 2 can comprise a propylene/ethylene copolymer, while layer 3 can comprise an ethylene/alpha-olefin copolymer. Outer layers 2 and 3 can, in one embodiment, each comprise from 15% and 25% of the total thickness of film 10.

Film structures in accordance with the invention can thus be depicted as A/B/A or as A/B/C, where A, B, and C each represent a distinct layer of a multilayer film.

In a first alternative embodiment (see FIG. 2), a film 20 comprises an internal layer 11, first outer layer 12, second outer layer 13, first intermediate layer 14, and second intermediate layer 15.

The internal layer 11, and outer layers 12 and 13, can comprise any of the materials disclosed above for layers 1, 2 and 3 respectively of FIG. 1.

Intermediate layers 14 and 15 each comprise an ethylene copolymer having a melt index less than 4.0, such as ethylene/alpha-olefin copolymer having a density of less than 0.921 grams/cubic centimeter, ethylene/vinyl acetate copolymer, ethylene/propylene/diene terpolymer, very low density polyethylene, a blend of very low density polyethylene and ethylene/vinyl acetate copolymer, a blend of very low density polyethylene and linear low density polyethylene, and multicomponent ethylene/alpha-olefin interpenetrating network resin.

In this first alternative embodiment, the internal layer 11 comprises from 5% to 20%, such as from 10% to 15%, e.g. 10% of the total thickness of film 20; outer layers 12 and 13 each comprise from 5% to 30%, such as from 10% to 25%, e.g. 20% of the total thickness of film 20; and intermediate layers 14 and 15 each comprise from 10% to 40%, such as from 15% to 35, and 20% to 30%, e.g. 25%, of the total thickness of film 20.

In a second alternative embodiment (see also FIG. 2), a film 20 comprises an internal layer 11, first outer layer 12, second outer layer 13, first intermediate layer 14, and second intermediate layer 15. The internal layer 11 can comprise any of the materials disclosed above for layers 14 and 15 of the first alternative embodiment of FIG. 2. Thus, internal layer 11 of this second alternative embodiment can comprise an ethylene copolymer having a melt index less than 4.0. Outer layers 12 and 13 can comprise any of the materials disclosed for layers 2 and 3 respectively of FIG. 1, and for layers 12 and 13 of the first alternative embodiment of FIG. 2. Thus, outer layers 12 and 13 of this second alternative embodiment can comprise an olefinic polymer. Intermediate layers 14 and 15 can comprise any of the materials disclosed for layer 1 of FIG. 1, and for layer 11 of the first alternative embodiment of FIG. 2. Thus, intermediate layers 14 and 15 of this second alternative embodiment can comprise an SBS or a blend that includes an SBS.

In this second alternative embodiment, the internal layer 11 comprises from 20% to 90%, such as from 30% to 80%, from 40% to 70%, e.g. 50% of the total thickness of film 20; outer layers 12 and 13 each comprise from 1% to 30%, such as from 5% to 25%, from 10% to 20%, e.g. 20% of the total thickness of film 20; and intermediate layers 14 and 15 each comprise from 1% to 30%, such as from 5% to 25%, from 10% to 20%, e.g. 10% of the total thickness of film 20.

Thus, in accordance with an alternative embodiment of the invention, film structures can be depicted as A/B/C/B/A or as A/B/C/B/D, or as A/B/C/D/A, or as A/B/C/D/E, where A, B, C, D and E each represent a distinct layer of a multilayer film.

The SBS of the internal layer 1 of FIG. 1, of the internal layer 11 of the first alternative embodiment of FIG. 2, and of the intermediate layers 14 and 15 of the second alternative embodiment of FIG. 2, can be e.g. a styrene-based thermoplastic elastomer sold as STYROFLEX® 2G66 from BASF. This styrene-based thermoplastic elastomer has a Vicat softening temperature of 35° C., a melt mass flow rate of 6 grams/10 minutes measured according to ASTM 1238—Condition G (200° C./5.00 kilograms), and a styrene content of from 60% to 80% by weight of the copolymer.

The styrene/butadiene/styrene block copolymer of the invention can have a melt mass flow index of from 2 to 12 gms/10 minutes at 200° C./5.00 kilograms, such as from 4 to 10, or 5 to 7 gms/10 minutes.

The styrene/butadiene/styrene block copolymer of the invention can have a styrene content of from 50% to 90% by weight of the copolymer, such as from 55% to 85%, 60% to 80%, or 65% to 75%, of styrene by weight of the copolymer.

Alternative SBS materials include STYROLUX™ from BASF; VECTOR™ from Dexco Polymers; K-RESIN™ styrene/butadiene copolymer from Chevron Phillips Chemical; and KRATON™ styrene/butadiene copolymer from Kraton Polymers.

Optionally, the SBS can be blended with one or more additional polymers to provide a blended core layer to further enhance film properties and characteristics (example: modulus). Examples of blending polymers are a styrene-based derivative copolymer, e.g. general purpose polystyrene (GPPS)(also known as crystalline polystyrene), high impact polystyrene (HIPS), styrene-ethylene-styrene copolymer (SES), styrene-isoprene-butadiene-styrene (SIBS), styrene-ethylene-butadiene-styrene (SEBS), and styrene/acrylate copolymers such as styrene/methyl methacrylate copolymer (SMMA). Alpha-olefin based polymers and/or copolymers, such as ethylene/alpha-olefin copolymer, can also be used as blending materials.

EXAMPLES

The invention can be further understood by way of illustration by reference to the examples herein.

Table 1 identifies the materials used in the examples. The remaining tables describe the formulations and/or properties of films, patches, and bags made with these materials.

TABLE 1

| Material Code | Tradename or Designation | Source |
|---|---|---|
| R1 | PE1335 ™ | Huntsman |
| R2 | DOWLEX ™ 2045.04 | Dow |
| R3 | — | — |
| R4 | ESCORENE ™ LD-318.92 | ExxonMobil |
| R5 | STYROFLEX ™ 2G 66 | BASF |
| R6 | NTX 101 ™ | ExxonMobil |
| R7 | EXCEED ™ 1012CA | ExxonMobil |

R1 is an ethylene/vinyl acetate copolymer with a vinyl acetate content of 3.3 wt. % by weight of the copolymer.
R2 is an ethylene/1-octene copolymer with a density of 0.920 grams/cc, and a melt index of 1.0 grams/10 minutes, and a 1-octene content of 6.5% by weight of the copolymer.
R3 is an EVA-based slip masterbatch.
R4 is an ethylene/vinyl acetate copolymer with a vinyl acetate content of 9 wt. % by weight of the copolymer.
R5 is an styrene/butadiene/styrene block copolymer with a nominal melt mass flow rate of 6 g/10 minutes at 200° C./5.00 kilograms (Condition G) and a Vicat Softening Point of 35° C..
R6 is a Zeigler/Natta catalyzed ethylene/1-hexene copolymer with a density of 0.917 grams/cc, a melt index of 0.90, and a melting point of 123° C..
R7 is a single site catalyzed ethylene/1-hexene copolymer with a density of 0.912 grams/cc, and a melt index of 1.0.

Shrink Film Examples

| Ex. 1 | Layer 1 | Layer 2 | Layer 3 | Layer 4 | Layer 5 |
|---|---|---|---|---|---|
| % of total | 20% | 25% | 10% | 25% | 20% |
| | 75% R1 | 72% R2 | R5 | 72% R2 | 75% R1 |
| | 15% R2 | 28% R4* | | 28% R4* | 15% R2 |
| | 10% R3 | | | | 10% R3 |

| Ex. 2 | Layer 1 | Layer 2 | Layer 3 | Layer 4 | Layer 5 |
|---|---|---|---|---|---|
| % of total | 20% | 25% | 10% | 25% | 20% |
| | 75% R1 | R6 | R5 | R6 | 75% R1 |
| | 15% R2 | | | | 15% R2 |
| | 10% R3 | | | | 10% R3 |

| Ex. 3 | Layer 1 | Layer 2 | Layer 3 | Layer 4 | Layer 5 |
|---|---|---|---|---|---|
| % of total | 20% | 25% | 10% | 25% | 20% |
| | 75% R1 | R7 | R5 | R7 | 75% R1 |
| | 15% R2 | | | | 15% R2 |
| | 10% R3 | | | | 10% R3 |

| Ex. 4 | Layer 1 | Layer 2 | Layer 3 | Layer 4 | Layer 5 |
|---|---|---|---|---|---|
| % of total | 25% | 20% | 10% | 20% | 25% |
| | 75% R1 | 72% R2 | R5 | 72% R2 | 75% R1 |
| | 15% R2 | 28% R4* | | 28% R4* | 15% R2 |
| | 10% R3 | | | | 10% R3 |

| Ex. 5 | Layer 1 | Layer 2 | Layer 3 | Layer 4 | Layer 5 |
|---|---|---|---|---|---|
| % of total | 25% | 20% | 10% | 20% | 25% |
| | 75% R1 | R7 | R5 | R7 | 75% R1 |
| | 15% R2 | | | | 15% R2 |
| | 10% R3 | | | | 10% R3 |

| Ex. 6 | Layer 1 | Layer 2 | Layer 3 | Layer 4 | Layer 5 |
|---|---|---|---|---|---|
| % of total | 25% | 20% | 10% | 20% | 25% |
| | 80% R1 | 72% R2 | R5 | 72% R2 | 80% R1 |
| | 15% R2 | 28% R4* | | 28% R4* | 15% R2 |
| | 5% R3 | | | | 5% R3 |

*The substrate layer of Examples 1 and 4 also included R3.

TABLE 2

Physical properties of Shrink Film Examples 1 to 6

| | Ex. 1 | Ex. 2 | Ex. 3 | Ex. 4 | Ex. 5 | Ex. 6 |
|---|---|---|---|---|---|---|
| Elmendorf Tear (grams/mil) | | | | | | |
| LD (Mean ± Std) | 111.2 ± 16.6 | 116.1 ± 16.9 | 77.1 ± 25.5 | 73.2 ± 24.0 | 77.2 ± 5.6 | 302.5 ± 48.6 |
| TD (Mean ± Std) | 132.6 ± 43.0 | 82.1 ± 25.0 | 76.5 ± 27.6 | 121.2 ± 25.5 | 29.3 ± 10.8 | 317.0 ± 49.8 |
| Elmendorf Tear (grams/mil) (Retest) | | | | | | |
| LD (Mean ± Std) | 104.0 ± 17.0 | 102.4 ± 11.5 | 85.6 ± 10.7 | 59.4 ± 11.6 | 86.2 ± 18.8 | — |
| TD (Mean ± Std) | 150.6 ± 64.8 | 86.3 ± 16.1 | 53.5 ± 33.4 | 107.0 ± 25.0 | 29.3 ± 10.8 | — |
| Tear Propagation Average Load Between Limits (gmf) | | | | | | |
| LD (Mean ± Std) | 33.4 ± 1.9 | 148.0 ± 43.6 | 36.0 ± 3.0 | 34.8 ± 3.5 | 28.6 ± 4.0 | 131 ± 7 |
| TD (Mean ± Std) | 23.0 ± 0.6 | 43.6 ± 8.8 | 20.7 ± 1.2 | 30.6 ± 8.7 | 19.2 ± 1.4 | 260 ± 36 |
| Load at Maximum (gmf) | | | | | | |
| LD (Mean ± Std) | 34.5 ± 1.9 | 398.6 ± 119.0 | 37.8 ± 2.7 | 36.8 ± 3.3 | 30.0 ± 3.5 | 249 ± 39 |
| TD (Mean ± Std) | 25.1 ± 0.3 | 59.8 ± 13.4 | 22.1 ± 1.4 | 33.1 ± 9.4 | 20.4 ± 1.6 | 512 ± 78 |
| Energy to Break (gmf-in) | | | | | | |

TABLE 2-continued

Physical properties of Shrink Film Examples 1 to 6

|  | Ex. 1 | Ex. 2 | Ex. 3 | Ex. 4 | Ex. 5 | Ex. 6 |
|---|---|---|---|---|---|---|
| LD (Mean ± Std) | 66.4 ± 3.4 | 454.8 ± 162.4 | 72.4 ± 4.1 | 68.1 ± 6.2 | 57.9 ± 8.2 | 287 ± 24 |
| TD (Mean ± Std) | 46.1 ± 1.5 | 86.6 ± 17.5 | 41.0 ± 2.3 | 59.9 ± 15.3 | 36.2 ± 2.9 | 673 ± 157 |
| Tear Resistance Maximum Load (gmf) | | | | | | |
| LD (Mean ± Std) | 632.0 ± 76.8 | 778.0 ± 168.0 | 648.0 ± 97.7 | 662.0 ± 90.4 | 516.0 ± 23.5 | 825 ± 77 |
| TD (Mean ± Std) | 647.0 ± 35.4 | 690.0 ± 129.0 | 616.0 ± 120.0 | 511.0 ± 45.7 | 555.0 ± 166.0 | 768 ± 151 |
| Shrink Tension (psi) - 240 F. | | | | | | |
| LD (Mean ± Std) | 284.6 ± 7.1 | 299.0 ± 6.8 | 290.2 ± 7.3 | 238.4 ± 7.4 | 267.3 ± 20.3 | — |
| TD (Mean ± Std) | 436.2 ± 3.6 | 389.2 ± 28.2 | 433.9 ± 4.5 | 343.1 ± 5.8 | 471.3 ± 9.9 | — |

It is to be understood that variations of the invention can be made without departing from the scope of the invention, which is not limited to the specific embodiments and examples disclosed herein.

What is claimed is:

1. A coextruded three layer solid state oriented heat shrinkable film consisting essentially of:
   a) an internal layer comprising a styrene/butadiene/styrene block copolymer, the internal layer comprising a first surface and a second surface; and
   b) a first and second outer layer each comprising an olefinic polymer, wherein the olefinic polymer is selected from the group consisting of ethylene/alpha olefin copolymer, ethylene/alkyl acrylate copolymer, ethylene/acrylic acid copolymer, butylene homopolymer and butylene copolymer, multicomponent ethylene/aipha-olefin interpenetrating network resin, high density polyethylene, a blend of high density polyethylene and ethylene/vinyl acetate copolymer, and a blend of high density polyethylene and low density polyethylene;
   wherein the film has:
      i) a free shrink (ASTM D 2732) of from 40% to 80% at 240° F in at least one of the longitudinal and transverse directions; and
      ii) an Elmendorf tear (ASTM D 1922-03) of from 70 grams/mil to 300 grams/mil in at least one of the longitudinal and transverse directions;
   wherein the first outer layer is directly adhered to the first surface of the internal layer;
   wherein the second outer layer is directly adhered to the second surface of the internal layer; and
   wherein the internal layer comprising a styrene/butadiene/styrene block copolymer comprises from 1% to 15% of the total film thickness.

2. The film of claim 1, wherein the styrene/butadiene/styrene block copolymer has a melt mass flow index of from 2 to 12 gms/ 10 minutes at 200° C/5.00kilograms.

3. The film of claim 1, wherein the styrene/butadiene/styrene block copolymer comprises from 50% to 90%, by weight of the copolymer, of styrene.

4. A coextruded multilayer solid state oriented heat shrinkable film comprising:
   a) an internal layer comprising a styrene / butadiene / styrene block copolymer;
   b) a first and second intermediate layer each comprising an ethylene copolymer having a melt index less than 4.0, wherein the ethylene copolymer having a melt index less than 4.0 is selected from the group consisting of ethylene/alpha-olefin copolymer having a density of less than 0.916 grams/cubic centimeter, ethylene/vinyl acetate copolymer, ethylene/propylene/diene terpolymer, very low density polyethylene, a blend of very low density polyethylene and ethylene/vinyl acetate copolymer, and multicomponent ethylene/alpha-olefin interpenetrating network resin; and
   c) a first and second outer layer each comprising an olefinic polymer;
   wherein the film has:
      i) a free shrink (ASTM D 2732) of from 40% to 80% at 240° F in at least one of the longitudinal and transverse directions; and
      ii) an Elmendorf tear (ASTM D 1922-03) of from 70 grams/mil to 300 grams/mu in at least one of the longitudinal and transverse directions; and
   wherein the internal layer comprising a styrene/butadiene/styrene block copolymer comprises from 1 to 15% of the total film thickness.

5. The film of claim 4, wherein the styrene/butadiene/styrene block copolymer has a melt mass flow index of less than 12 gms/10 minutes at 200° C/5.00 kilograms.

6. The film of claim 4. wherein the styrene/butadiene/styrene block copolymer comprises from 50% to 90%, by weight of the copolymer, of styrene.

7. The film of claim 4, wherein the first and second outer layer each comprise an olefinic polymer selected from ethylene/alpha olefin copolymer, ethylene/vinyl acetate copolymer, ethylene/alkyl acrylate copolymer, ethylene/acrylic acid copolymer, ionomer, propylene polymer and copolymer, butylene polymer and copolymer, multicomponent ethylene/aipha-olefin interpenetrating network resin, a blend of a propylene homopolymer and a propylene/ethylene copolymer, high density polyethylene, a blend of high density polyethylene and ethylene/vinyl acetate copolymer, and a blend of high density polyethylene and low density polyethylene.

8. A coextruded multilayer solid state oriented heat shrinkable film comprising:
   a) an internal layer comprising an ethylene copolymer having a melt index less than 4.0, wherein the ethylene copolymer having a melt index less than 4.0 is selected from the group consisting of ethylene/alpha-olefin copolymer having a density of less than 0.916 grams/cubic centimeter, ethylene/vinyl acetate copolymer, ethylene/propylene/diene terpolymer, very low density polyethylene, a blend of very low density polyethylene and ethylene/vinyl acetate copolymer, and multicomponent ethylene/alpha-olefin interpenetrating network resin;

b) a first and second intermediate layer each comprising a styrene/butadiene/styrene block copolymer; and c) a first and second outer layer each comprising an olefinic polymer;

wherein the film has:

i) a free shrink (ASTM D 2732) of from 40% to 80% at 240° F in at least one of the longitudinal and transverse directions; and ii) an Elmendorf tear (ASTM D 1922-03) of from 70 grams/mil to 300 grams/mil in at least one of the longitudinal and transverse directions; and wherein the first and second intermediate layer comprising a styrene/ butadiene/ styrene block copolymer together comprise from 1 to 15% of the total film thickness.

9. The film of claim 8, wherein the styrene/butadiene/styrene block copolymer has a melt mass flow index of less than 12 gms/ 10 minutes at 200° C/ 5.00 kilograms.

10. The film of claim 8, wherein the styrene/butadiene/styrene block copolymer comprises from 50% to 90%, by weight of the copolymer, of styrene.

* * * * *